(12) United States Patent
Leigh et al.

(10) Patent No.: US 11,381,891 B2
(45) Date of Patent: Jul. 5, 2022

(54) VIRTUAL FIBER ADAPTER FOR WAVELENGTH-AS-A-SERVICE COMMUNICATIONS

(71) Applicant: HEWLETT PACKARD ENTERPRISE DEVELOPMENT LP, Houston, TX (US)

(72) Inventors: Kevin B. Leigh, Houston, TX (US); Sagi Varghese Mathai, Palo Alto, CA (US); Paul Kessler Rosenberg, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 140 days.

(21) Appl. No.: 16/863,975

(22) Filed: Apr. 30, 2020

(65) Prior Publication Data
US 2021/0345024 A1 Nov. 4, 2021

(51) Int. Cl.
*H04Q 11/00* (2006.01)
*H04J 14/02* (2006.01)

(52) U.S. Cl.
CPC ...... *H04Q 11/0066* (2013.01); *H04J 14/0212* (2013.01); *H04J 14/0227* (2013.01); *H04Q 11/0005* (2013.01); *H04Q 2011/0016* (2013.01); *H04Q 2011/0039* (2013.01); *H04Q 2011/0075* (2013.01)

(58) Field of Classification Search
None
See application file for complete search history.

(56) References Cited

U.S. PATENT DOCUMENTS

| 5,005,166 | A | 4/1991 | Suzuki et al. | |
|---|---|---|---|---|
| 5,208,691 | A | 5/1993 | Nishio | |
| 9,491,526 | B1* | 11/2016 | Zhao | H04Q 11/0005 |
| 2002/0196491 | A1 | 12/2002 | Deng et al. | |
| 2007/0242953 | A1* | 10/2007 | Keyworth | G02B 6/29313 398/48 |
| 2010/0315972 | A1* | 12/2010 | Plotnik | H04L 67/125 370/254 |
| 2012/0008943 | A1* | 1/2012 | Singla | H04J 14/0212 398/45 |
| 2014/0308037 | A1 | 10/2014 | Hu et al. | |
| 2014/0341568 | A1* | 11/2014 | Zhang | H04J 14/0212 398/34 |

OTHER PUBLICATIONS

Gu et al., "Time-division-multiplexing-wavelength- division-multiplexing-based architecture for ONoC", Optical Society of America, vol. 9, No. 5, May 12, 2017, pp. 351-363.

* cited by examiner

*Primary Examiner* — David W Lambert
(74) *Attorney, Agent, or Firm* — Sheppard Mullin Richter & Hampton LLP

(57) ABSTRACT

Systems and methods are provided for flexible wavelength assignments in a communication network. An optical adapter is provided for the systems and methods. The optical adapter has a first interface connected to an optical switch via a first optical cable, a second interface connected to a plurality of server ports via a plurality of second optical cables, and a controller coupled to a switch controller of the optical switch. The controller is configured to perform: obtaining instructions from the switch controller; and assigning, based on the instructions, one or more wavelengths for a time slot to one of the server ports, wherein the controller performs the assigning without direct communication with the server ports.

18 Claims, 16 Drawing Sheets

VIRTUAL FIBER ADAPTER FOR WAVELENGTH-AS-A-SERVICE COMMUNICATIONS

DESCRIPTION OF RELATED ART

An optical network generally includes an optical transmitter, an optical receiver, and an optical fiber connected therebetween. To increase transmission capacity, a wavelength-division multiplexing (WDM) method is introduced. The WDM method allows multiple wavelengths to be transmitted in a single physical fiber, thus increasing bandwidth of the transmission. The WDM method requires a multiplexer at the transmitter for combining several signals to be transmitted to the receiver. The receiver is equipped with a demultiplexer to split the multiplexed signal to recover the original signals. For example, implementing a four-wavelength WDM method requires one fourth of physical fibers for a single-wavelength method.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

A four-wavelength coarse wavelength-division multiplexing (4λ-CWDM) method allows four times higher bandwidth in a fiber compared to one-wavelength method. 4λ-CWDM is useful for switch-to-switch links and especially for high port count switches, requiring a simpler, smaller faceplate, lower cost to route fibers, etc. However, a server port may not need the full 4λ bandwidth from a fiber at all times to connect to a switch port. Traditional installations have one-to-one connection between a switch port and a server port. Most servers in traditional enterprise data centers do not use their network port bandwidth fully all the time, resulting in stranded bandwidth on switch downlink ports connecting to servers.

This disclosure provides a method in which the bandwidth of a switch port is shared among a number of server ports. A bandwidth sharing optical adapter "Virtual Fiber Adapter (vfAdapter)" is disclosed. The vfAdapter enables wave-division multiplexed signals to be allocated by time-division multiplexing, such that a variable quantity of virtual fibers (i.e., wavelengths of a CWDM wavelength set) are allowed to be present in a physical fiber in different time slots controlled by the switch port using in-band or out-of-band signals.

Figure 1:
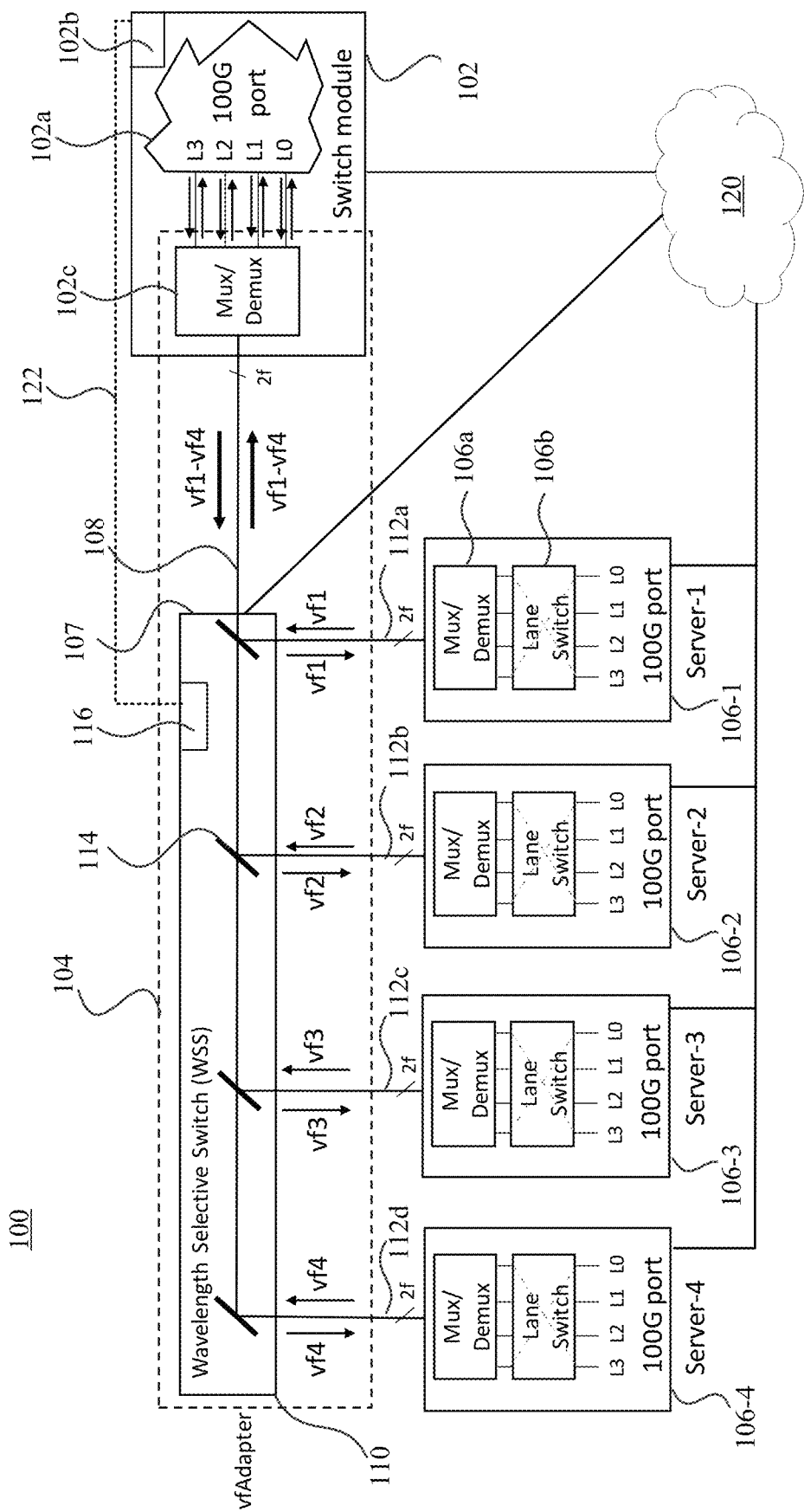
FIG. 1 is a diagram illustrating an optical network according to one example embodiment.

Reference is now made to FIG. 1. FIG. 1 illustrates an optical network 100 that includes one switch module 102, an optical adapter (vfAdapter) 104, and a plurality of servers 106-1 (Server-1), 106-2 (Server-2), 106-3 (Server-3), and 106-4 (Server-4) (collectively 106). The vfAdapter 104 includes a first interface 107 connected, via a first optical cable 108, to a switch port 102*a* of the switch module 102. The vfAdapter 104 further includes a second interface 110 connected, via a plurality of second optical cables 112*a*-112*d* (collectively 112), to server ports of the servers 106. Each of the first interface 107 and the second interface 110 may be a duplex fiber interface configured to allow two-way traffic from and to the respective interfaces.

The vfAdapter 104 further includes a wavelength selective switch (WSS) 114 configured to multiplex, demultiplex, and direct optical signals downstream (from the switch to the servers) or upstream (from the servers to the switch). The WSS 144 may be constructed from various optical components such as dielectric optical filters, mirrors, arrayed waveguide gratings, micro-ring resonators, actuators, lattice filters, etc. The vfAdapter 104 further includes a controller 116 configured to control the operations of the WSS 114. The vfAdapter controller 116 is coupled to a switch controller 102*b* of the switch module 102. The vfAdapter controller 116 is configured to obtain instructions from the switch controller 102*b* for controlling the WSS 114. For example, the vfAdapter controller 116 can receive instructions from the switch controller 102*b* to assign wavelengths to the servers 106 for a time slot. The vfAdapter controller 116 may include a time keeping device, e.g., a timer, for keeping the timing for the assigned time slot. To control WSS 114, the switch controller 102*b* sends vf assignments with associated time slots to the vfAdapter controller 116. The vfAdapter controller 116 may program these vf assignments for different time slots in its memory, and later apply to WSS 114. This configuration keeps a control scheme flexible and adjustable based on needs. The details of the control techniques will be provided below.

The switch module 102 further includes a multiplexer/demultiplexer (Mux/Demux) 102*c* configured to multiplexing signals from the switch port 102*a* for the servers 106 or demultiplexing a multiplexed signal from the servers 106 via the vfAdapter 104. The Mux/Demux 102*c* may also perform electrical/optical conversion function to convert electrical signals from within switch 102 to optical cable 108.

Each of the servers 106 also includes a multiplexer/demultiplexer (Mux/Demux) 106*a* and a lane switch 106*b*. The Mux/Demux 106*a* is configured to multiplex signals from the lanes (L0, L1, L2, L3) of a respective server 106 or demultiplex a multiplexed signal from the switch 102 transmitted via the vfAdapter 104. The lane switch 106*b* is configured to swap lanes for a respective lane when, for example, some of the lanes may be inactive (to match with the assigned number of vfs), or not functional. In some embodiments signaling rates of electrical lanes (L0, L1, L2, L3) may be slower than the optical signals transported on vfs, where lane switch may perform gear-box function, i.e., converting multiple slower speed electrical lanes to fewer wavelengths carrying faster speed optical signals. The Mux/Demux 106*a* may also perform electrical/optical conversion function to convert electrical signals from within each server 106 to optical cable 112, and vice versa.

Each of the first optical cable 108 and the second optical cables 112 may be a physical optical fiber that allows two-way traffic, e.g., a duplex fiber. The server end of optical cable 112 may have an optical connector (not shown) interfacing to corresponding optical receptacle connector on server 106, and the vfAdapter end of optical cable 112 may be fix-connected to vfAdapter's second interface 110 or to an optical connector (not shown) present on vfAdapter's second interface 110. Similarly, the switch end of optical cable 108 may have an optical connector (not shown) interfacing to corresponding optical receptacle connector on switch 102, and the vfAdapter end of optical cable 108 may be fix-connected to vfAdapter's first interface 107 or to an optical connector (not shown) present on vfAdapter's first interface 107.

In operation, the switch controller 102*b* is configured to negotiate with the servers 106 to make a decision for wavelength assignments for the servers 106. For example, the switch controller 102*b* can send a query to each of the servers 106 using the first optical cable 108, the vfAdapter 104, and the second optical cables 112, requesting the servers 106 to report their needs for wavelengths. Based on the negotiation, the switch controller 102*b* can send a wavelength assignment instruction to the vfAdapter controller 116 to enable the vfAdapter controller 116 to control the WSS 114 to implement wavelength routings for the servers 106. An individual wavelength may be assigned to a server, i.e., its server port, as a service. Because the assignment can be performed down to one wavelength as a unit, a wavelength may be referred to as a virtual fiber (vf) in this disclosure. For example, a server 106 may request a certain bandwidth for performing its operations. Based on the request, the switch controller 102*b* may assign any integer number of wavelengths (or vfs) to the requesting server. The switch controller 102*b* then generates a wavelength-assignment instruction for the vfAdapter controller 116 to ensure the requesting server is able to use the assigned vfs to receive or transmit signals. In this example, the vfAdapter controller 116 can assign vfs to the servers without direct communication with the server ports as the negotiation is performed between the switch module 102 and the servers 106. This allows a control scheme that would not require major changes to existing switch-server communication technology.

In some embodiments, the wavelength negotiation between the switch module 102 and the servers 106 may be alternatively or additionally implemented in a management network 120 as illustrated in FIG. 1. That is, the switch module 102 can communicate with the servers 106 via the management network 120 to determine wavelength assignments. Moreover, alternatively or additionally, a dedicated control signal connection may be set up between the switch controller 102*b* and the vfAdapter controller 116. For example, the switch controller 102*b* may communicate with the vfAdapter controller 116 through a directly-connected dedicated link 122, instead of from the management network 120 to the vfAdapter 104 as shown in FIG. 1.

The above techniques allow a single switch port to connect to four server ports using the vfAdapter 104. However, this disclosure is not limited to this configuration. Fewer or more than four servers may be connected to one switch port via the vfAdapter 104. Including the vfAdapter 104 in the network 100 allows N vfs (N≥2) within a physical fiber (pf) from a switch port to be flexibly directed to N servers. The assignment of vfs to the servers 106 may be implemented with unweighted or weighted allocation. In unweighted allocation, each server is assigned an equal amount of vfs. In weighted allocation, the vfAdapter 104 can assign uneven amount of vfs among the servers. For example, the vfAdapter 104 may assign two vfs to server 106-1 and no vf to server 106-2.

In some implementations, the switch module 102 is configured to flexibly assign vfs to the server 106 based on a pre-programmed weighted allocation of bandwidth at allocated time slots or based on server requests at allocated time slots. The time slot duration may be determined and programmed by system management processes and/or automatically set by the switch controller 102*b*, and may be dynamically changed after switch controller 102*b* communicates with servers 106. The time slot duration may vary depending on signaling rate, switch port bandwidth capacity limit (including switch system bandwidth congestion status), server port bandwidth demand, and application needs. At the end of each time slot, all servers may be given a "default negotiation" vf for both transmit and receive for a vf negotiation duration that is significantly shorter than the time slot duration, e.g., vf1 to Server-1, vf2 to Server-2, vf3 to Server-3 and vf4 to Server-4. After the vf negotiation duration, vfs are assigned according per the switch controller 102*b* commands to the vfAdapter 104 and the servers 106.

An example wavelength assignment scheme is now provided with continued reference to FIG. 1. The switch port 102*a* may be a 100 G (aggregate bandwidth of gigabits per second) port that has four links (L0, L1, L2, L3) such that it can support 100 G transmission. Each of the sever 106 has a server port that supports up to 100 G transmission bandwidth capacity. For downstream traffic, the switch port 102*a* transmits to each of the server ports at 25 G. As shown in FIG. 1, the switch port 102*a* uses vf1-vf4 (e.g., four different wavelengths) to transmit downstream signals to the servers 106. Each of the vf1-vf4 can provide 25 G transmission capacity. The Mux/Demux 102*c* at the switch module 102 may multiplex the signals and send the multiplexed signals to vfAdapter 104 via the first optical cable 108. The vfAdapter 104 may demultiplex the received signals and use its WSS 114 to direct the signals on vf1-vf4 to each destination server 106. For example, the vfAdapter 104 controls its WSS 114 to direct signals on vf1 to the server 106-1, signals on vf2 to the server 106-2, signals on vf3 to the server 106-3, and signals on vf4 to the server 106-4.

For upstream traffic, each of the servers 106 uses the vf assigned to them by the vfAdapter controller 116 to send signals to the switch port 102a. That is, the server 106-1 uses vf1 to send signals to the vfAdapter 104; the server 106-2 uses vf2 to send signals to the vfAdapter 104; the server 106-3 uses vf3 to send signals to the vfAdapter 104; and the server 106-4 uses vf4 to send signals to the vfAdapter 104. The vfAdapter 104 allows each of the servers 106 to send signals at 25 G. The vfAdapter 104 then multiplexes the signals from the servers 106 and transmits multiplexed signals to the switch module 102. The Mux/Demux 102c at the switch module 102 demultiplexer the received signals. The traffic in the above scheme are the signal communications performed with assigned vfs. In this example, each of the servers is assigned a bandwidth of 25 G for transmission (Tx) and 25 G for reception (Rx). It should be noted that the vf assignments may be changed from time to time based on needs. For example, the vf assignments may be changed based on a predefined datacenter bandwidth allocation policies or a Service Level Agreement for a predefined Quality of Service (QoS) bandwidth parameter specified between the servers 106 and the switch 102. The vf assignments may be changed upon new wavelength requests from one or more of the servers 106.

Figure 2:
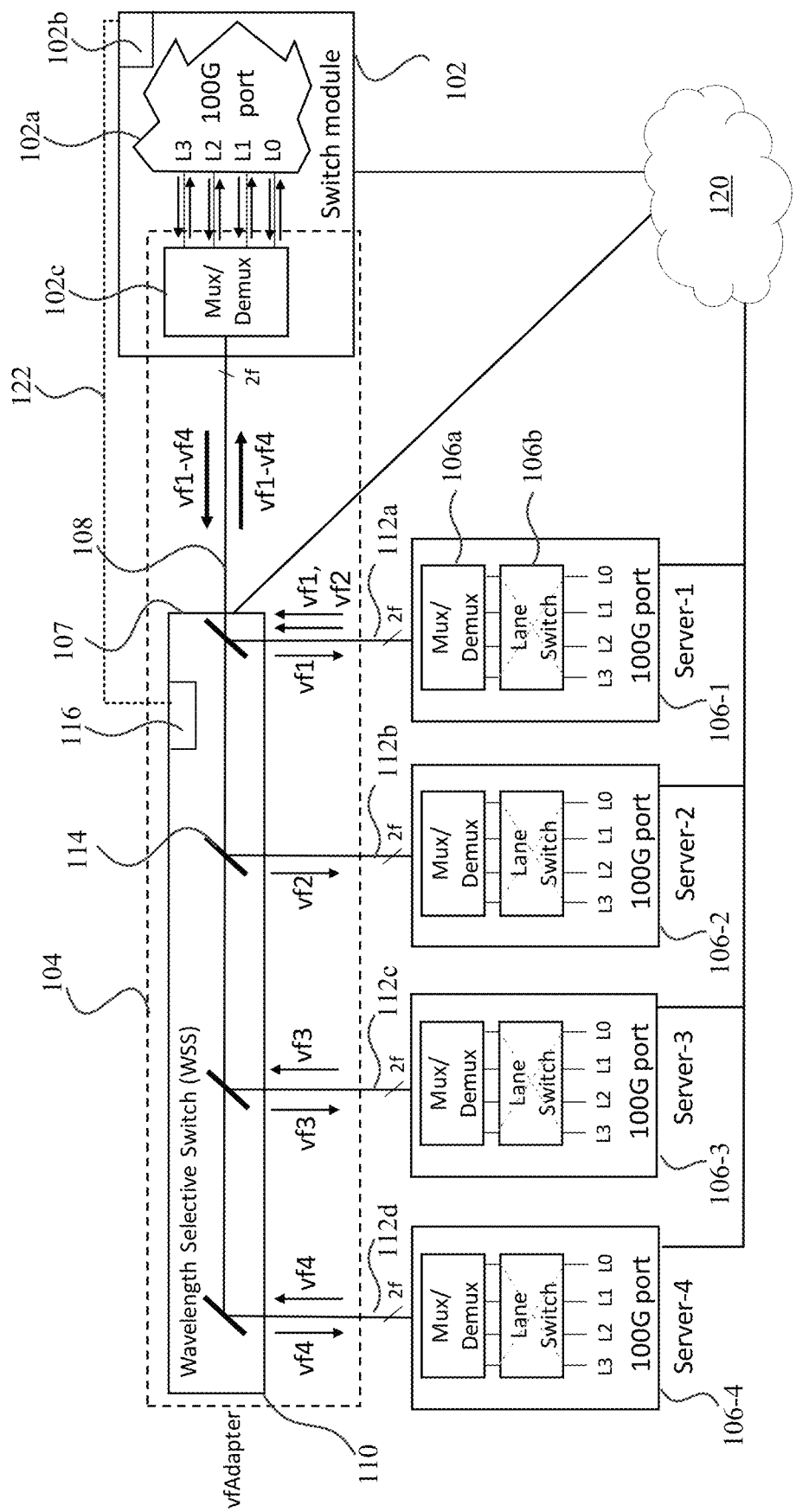
FIG. 2 illustrates a vfMotion scheme in an optical network where one or more virtual fibers are moved/reassigned from one server to another, according to one example embodiment.

FIG. 2 illustrates a vfMotion scheme consistent with another embodiment of the present disclosure. In FIG. 2, for downstream traffic, the switch port 102a transmits to each of the server ports at 25 G, similar to that in FIG. 1. For upstream traffic, based on the negotiation between the switch 102 and servers 106, the vfAdapter 104 assigns 50 G for a time slot for the server 106-1, 25 G for the time slot for each of the servers 106-3 and 106-4, and no bandwidth (due to no vf) for the server 106-2. As compared to FIG. 1, this process of reassigning/moving one or more vfs from one server to another is called vfMotion. In the illustrated example, vf2 for upstream traffic is assigned to the server 106-2 in FIG. 1, but is reassigned/moved to the server 106-1 as shown in FIG. 2. Thus, the server 106-1 can transmit its upstream signals via vf1 and vf2 during the assigned time slot. Each of the servers 106-3 and 106-4 can transmits their upstream signals via vf3 and vf4, respectively, during the assigned time slot. At the end of the time slot, if there is no new wavelength assignment request from the servers 106, each of the servers 106 can continue to use their assigned vf(s) for signal transmission for another time slot. If one of the servers 106 needs to change its wavelength assignment, the requesting server can send its demand to the switch controller 102b. At the end of the time slot, the switch controller 102b can instruct the vfAdapter controller 116 to stop/suspend the previous assignments and wait for new instructions. The switch 102 and the servers 106 enter the wavelength negotiation stage so the switch controller 102b can determine whether to make any changes to the wavelength assignment.

Figure 3:
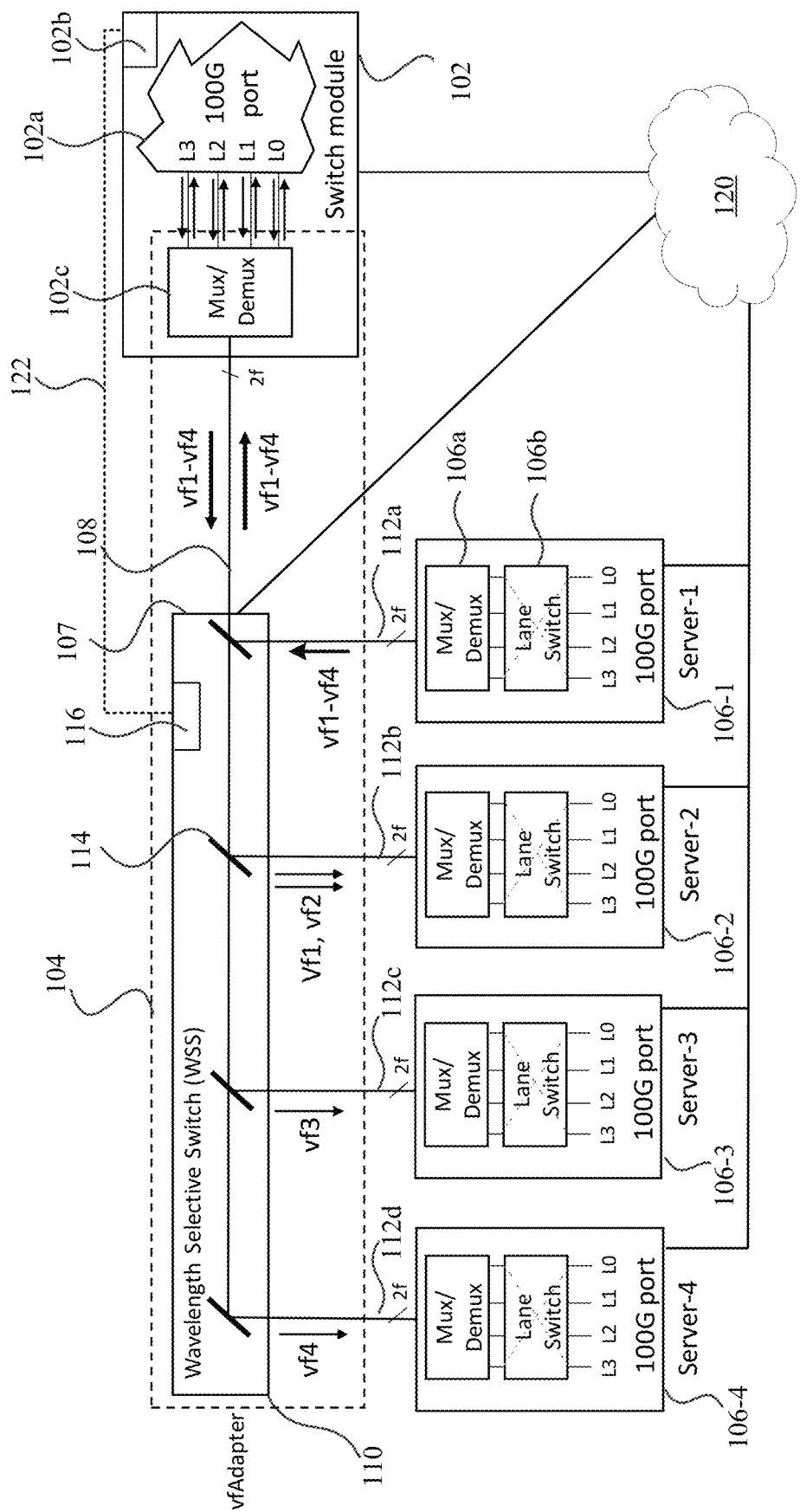
FIG. 3 illustrates another vfMotion scheme in an optical network where one or more virtual fibers are moved/reassigned from one server to another, according to one example embodiment.

FIG. 3 illustrates another vfMotion scheme consistent with another embodiment of the present disclosure. In FIG. 3, for downstream traffic, based on instructions from the switch controller 102b, the vfAdapter controller 116 assigns to the server 106-1 with no vf, to the server 106-2 with vf1 and vf2 for a total capacity of 50 G, and each of the servers 106-3 (vf3) and 106-4 (vf4) a 25 G capacity. Each of the servers 106 can receive the downstream signals with the assigned vf(s).

For upstream traffic, based on the negotiation between the switch 102 and servers 106, the vfAdapter 104 assigns 100 G for a time slot for the server 106-1, and no vf for the servers 106-2, 106-3, and 106-4. Thus, the server 106-1 can transmit its upstream signals via vf1-vf4 (i.e., 100 G) during the assigned time slot. Each of server Tx ports of the servers 106-2, 106-3, and 106-4 are idle for the time slot. At the end of the time slot, all servers 106 are temporarily given a default vf, and if there is no new wavelength assignment request from the servers 106, the server 106-1 can continue to transmit its upstream signals via vf1-vf4 during another time slot. If one of the servers 106 needs to change its wavelength assignment, the requesting server can send its demand to the switch controller 102b. At the end of the time slot, the switch 102 and the servers 106 enter the wavelength negotiation stage so the switch controller 102b can determine whether to make any changes to the wavelength assignment.

Figure 4:
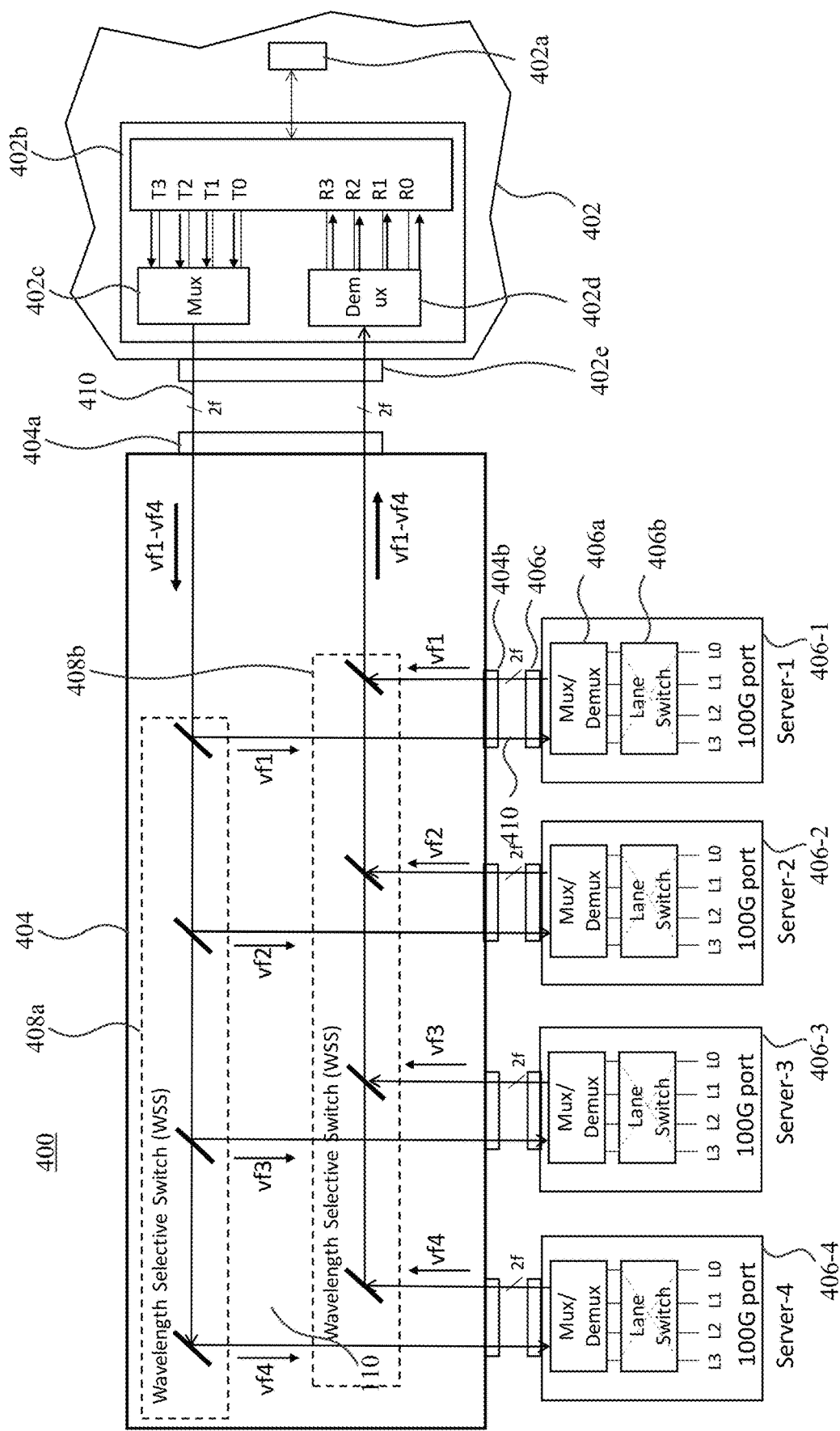
FIG. 4 is a diagram illustrating another optical network according to one example embodiment.

Reference is now made to FIG. 4. FIG. 4 illustrates another optical network 400 that includes a switch 402, an optical adapter (vfAdapter) 404, and a plurality of servers 406-1 (Server-1), 406-2 (Server-2), 406-3 (Server-3), and 406-4 (Server-4) (collectively 406). The switch 402 includes a switch controller 402a, a switch port 402b that includes a multiplexer (Mux) 402c and a demultiplexer (Demux) 402d, and a switch connector 402e. The switch controller 402a may be an application-specific integrated circuit (ASIC) configured to perform operations described in this disclosure. The Mux 402c and Demux 402d may also perform electrical/optical conversion function to convert electrical signals from within the switch 402 to optical cable 410, and vice versa.

The vfAdapter 404 includes a first connector 404a, a plurality of second connectors 404b, a first WSS 408a, and a second WSS 408b. Each of the servers 106 includes a multiplexer/demultiplexer (Mux/Demux) 406a, a lane switch 406b, and a server connector 406c. The Mux/Demux 406a is configured to multiplex signals from the lanes (L0, L1, L2, L3) of a respective server 406 or demultiplex a multiplexed signal from the switch 402 via the vfAdapter 404. The lane switch 406b is configured to swap lanes for a respective lanes when, for example, some of the lanes may be inactive (to match with the assigned number of vfs), or not functional. In some embodiments signaling rates of electrical lanes (L0, L1, L2, L3) may be slower than the optical signals transported on vfs, where lane switch may perform gear-box function, i.e., converting multiple slower speed electrical lanes to fewer wavelengths carrying faster speed optical signals. The Mux/Demux 406a may also perform electrical/optical conversion function to convert electrical signals from within each server 406 to optical cable 410, and vice versa.

Each of the connectors 402e, 404a, 404b, 406c are configured to receive an optical cable/fiber 410. For example, the connectors may include a mechanism to receive a plug on the cables 410. The structures and configurations of the network 400 is similar to those of the network 100 in FIG. 1, except that the vfAdapter 404 includes two WSS 408a and 408b. Each of the WSS 408a and the WSS 408b may include a plurality of dielectric multilayer optical filters or mirrors or a combination of dielectric multilayer optical filters and mirrors configured to direct light beams. In FIG. 4, the first WSS 408a is provided to direct light beams from the switch 402 to individual servers 406, while the second WSS 408b is provided to direct light beams from individual servers 406 to the switch 402. For example, the downstream traffic from the switch 402 is transmitted using vf1-vf4 to the first WSS 408a, which may demultiplex the signals and forward demultiplexed signals to servers 106 with the assigned vf(s). As illustrated in FIG. 4, the first WSS 408a directs light signals to the server 406-1 with vf1, to the server 406-2 with vf2, to the server 406-3 with vf3, and to the server 406-4 with vf4. In the upstream traffic, each of the server 406 sends their signals to the second WSS 408b via the assigned vf, which then multiplexes the received signals and forwards them to the switch 402.

Figure 5:
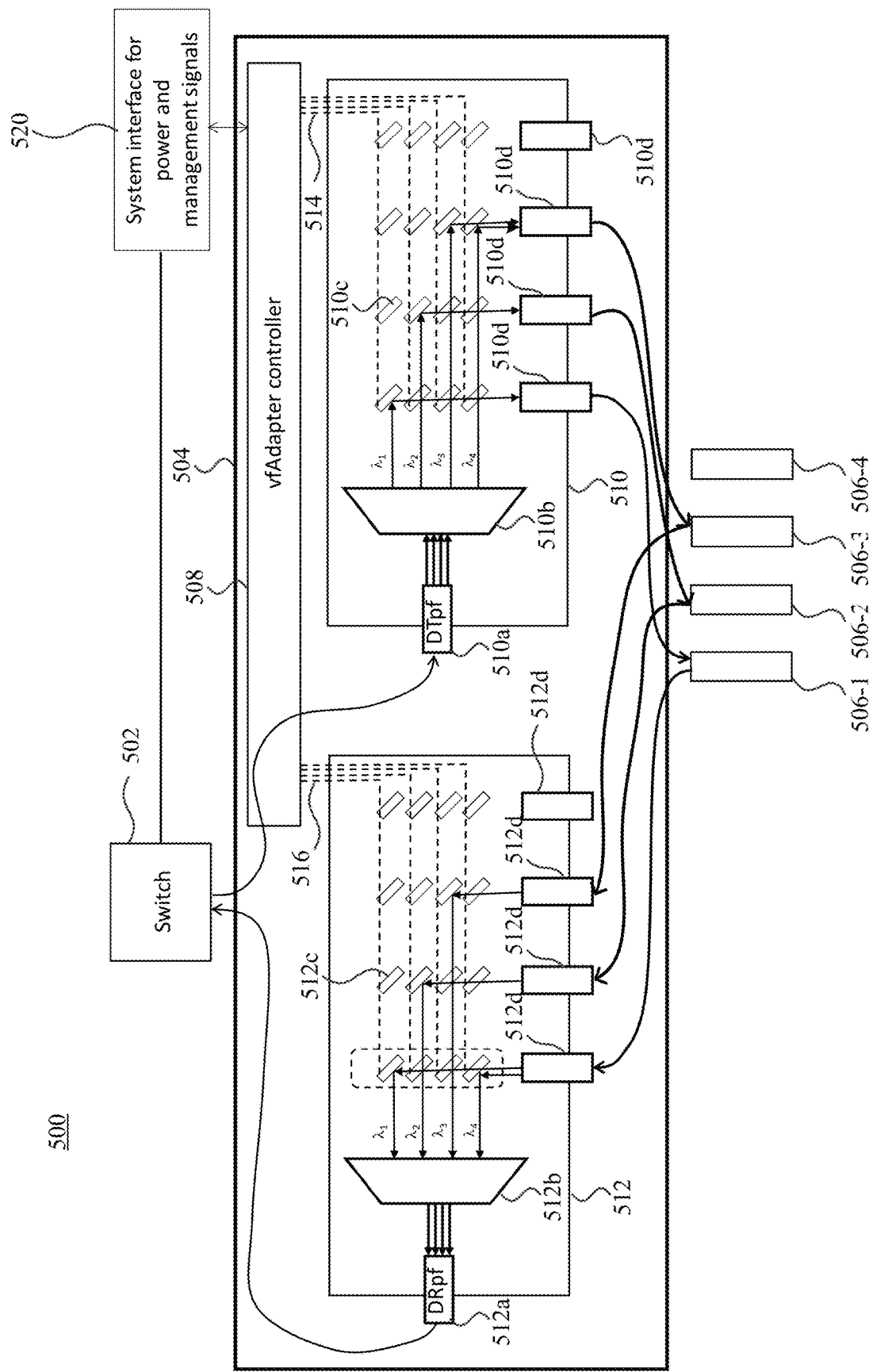
FIG. 5 is a diagram illustrating yet another optical network according to one example embodiment.

FIG. 5 is a schematic diagram illustrating another optical network 500. The Network 500 includes a switch 502, an optical adapter (vfAdapter) 504, and a plurality of servers 506-1, 506-2, 506-3, and 506-4 (collectively 506). The vfAdapter 504 includes a vfAdapter controller 508, a first WSS 510, and a second WSS 512. The first WSS 510 includes a Downlink Transmit physical fiber (DTpf) 510a, a demultiplexer 510b, a plurality of optical filters 510c, and a plurality of Server Receive physical fibers (SRpf) 510d. The second WSS 512 includes a Downlink Receive physical fiber (DRpf) 512a, a multiplexer 512b, a plurality of optical filters 512c, and a plurality of Server Transmit physical fibers (STpf) 512d. The first WSS 510 is connected to the switch 502 to receive signals from the switch 502 over virtual fibers within the DTpf 510a. The signals are demultiplexed by the demultiplexer 510b. The vfAdapter controller 508 is configured to send control signals 514 to the optical filters 510c to enable the optical filters 510c to direct the demultiplexed signals to the destination servers 506. The signals are then received by servers 506 over virtual fibers within SRpfs 510d that connect to the servers 506. Each of the SRpfs 510d is connected to corresponding a server 506. In the illustrated embodiment in FIG. 5, wavelength $\lambda_1$ is used to send signals to the server 506-1; wavelength $\lambda_2$ is used to send signals to the server 506-2; and wavelengths $\lambda_3$ and $\lambda_4$ are used to send signals to the server 506-3.

The servers 506 transmit signals over virtual fibers within STpfs 512d to the second WSS 512. The vfAdapter controller 508 is configured to send control signals 516 to the optical filters 512c to enable the optical filters 512c to direct the signals from the servers to the switch 502. For example, in one embodiment, the optical filters 512c are controlled to direct wavelengths $\lambda_1$ and $\lambda_4$ that are assigned to the server 506-1 to the multiplexer 512b, to direct wavelength $\lambda_2$ that is assigned to the server 506-2 to the multiplexer 512b, and to direct wavelength $\lambda_3$ that is assigned to the server 506-3 to the multiplexer 512b. The multiplexer 512b multiplexes the received signals and transmits them via the virtual fibers within the DRpf 512a to the switch 502. Although the server 506-4 is physically connected to WSS 510 via physical fiber SRpf 510d for receiving and to WSS 512 via physical fiber 512d for transmitting, the physical fiber lines to represent optical signal paths are not shown in FIG. 5 for simplicity.

The vfAdapter controller 508 is connected to a system interface 520 for power and management signals to receive control signals provided by a switch controller of the switch 502. The control signals enable the vfAdapter controller 508 to generate control signals 514 and 516 for the optical filters 510c and 512c.

Figure 6:
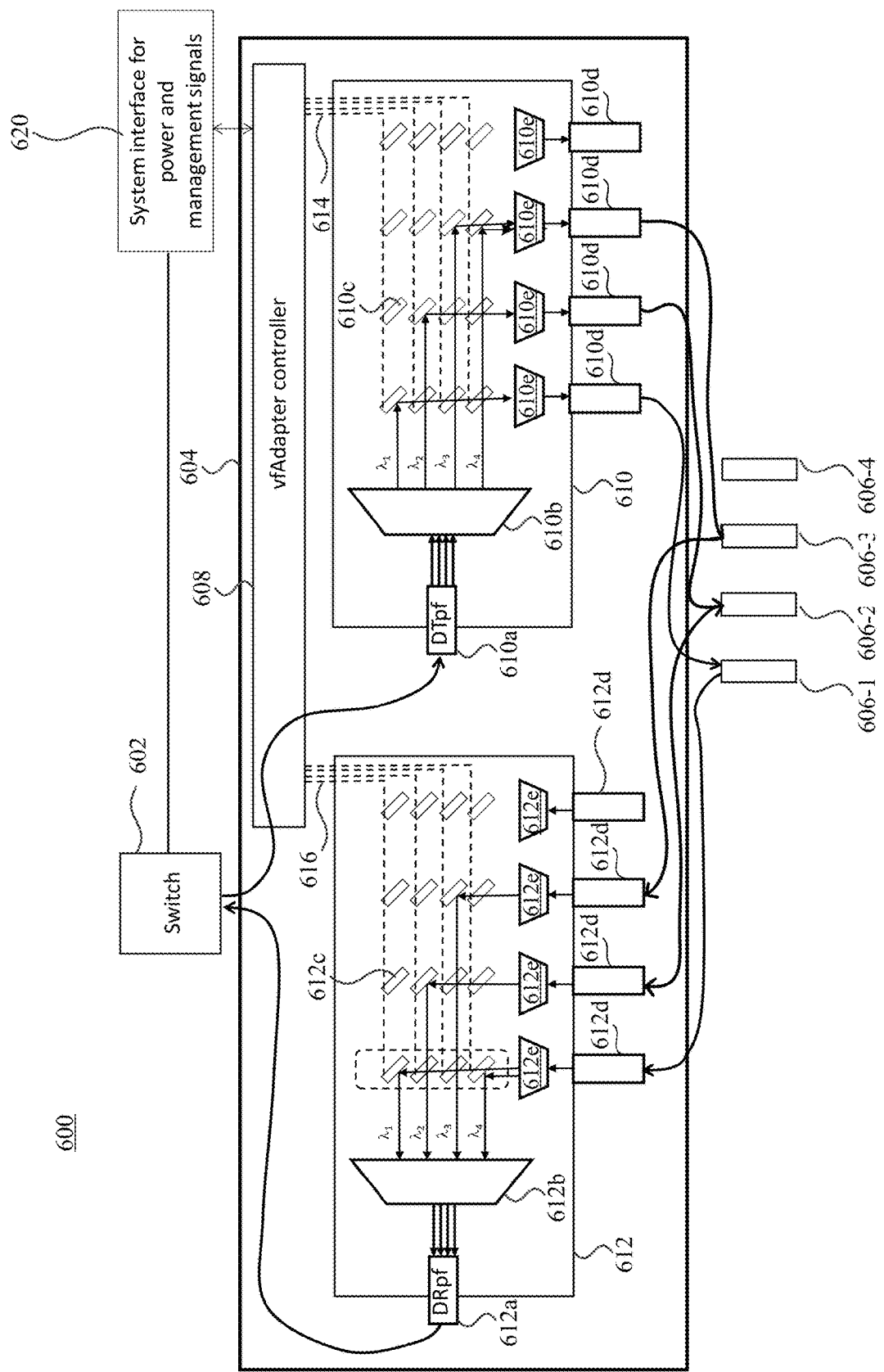
FIG. 6 is a diagram illustrating yet another optical network according to one example embodiment.

FIG. 6 is a schematic diagram illustrating another optical network 600. The Network 600 includes a switch 602, an optical adapter (vfAdapter) 604, and a plurality of servers 606-1, 606-2, 606-3, and 606-4 (collectively 606). The vfAdapter 604 includes a vfAdapter controller 608, a first WSS 610, and a second WSS 612. The first WSS 610 includes a Downlink Transmit physical fiber (DTpf) 610a, a demultiplexer 610b, a plurality of mirrors 610c, a plurality of Server Receive physical fibers (SRpf) 610d, and a plurality of multiplexers 610e. The second WSS 612 includes a Downlink Receive physical fiber (DRpf) 612a, a multiplexer 612b, a plurality of mirrors 612c, a plurality of Server Transmit physical fibers (STpf) 612d, and a plurality of multiplexers 612e. The first WSS 610 is connected to the switch 602 to receive signals from the switch 602 over virtual fibers within the DTpf 610a. The signals are demultiplexed by the demultiplexer 610b. The vfAdapter controller 608 provides mirror control signals 614 to the mirrors 610c to control the mirrors 610c to direct the demultiplexed signals to the destination servers 606. It should be noted that although mirrors 610c are arranged in rows and columns (2D) in FIG. 6 for directing the light beams, this disclosure is not limited to this configuration. For example, each mirror 610c can be split into N mirrors corresponding to the N wavelengths. Alternatively, a 3D arrangement of mirrors can be adopted to enable the intended functions shown in FIG. 6. Before leaving the first WSS 610, the signals may be multiplexed by a multiplexer 610e if more than one wavelengths are assigned to a server 606. The signals are then received by servers 606 over virtual fibers within SRpfs 610d. In the illustrated embodiment in FIG. 6, wavelength $\lambda_1$ is used to send signals to the server 606-1; wavelength $\lambda_2$ is used to send signals to the server 606-2; and wavelengths $\lambda_3$ and $\lambda_4$ are used to send signals to the server 606-3. The signals bound for server 606-3 are multiplexed by the multiplexer 610e before being transmitted to the server 606-3.

The servers 606 transmit signals over virtual fibers within STpfs 612d to the second WSS 612. If the signals from the servers are multiplexed, they may be demultiplexed by the demultiplexer 612e before being transmitted to the mirrors 612c. The vfAdapter controller 608 provides mirror control signals 616 to the mirrors 612c to control the mirrors 612c to direct the signals from the servers to the switch 602. For example, referring to FIG. 6, the mirrors 612c are controlled to direct wavelengths $\lambda_1$ and $\lambda_4$ that are assigned to the server 606-1 to the multiplexer 612b, to direct wavelength $\lambda_2$ that is assigned to the server 606-2 to the multiplexer 612b, and to direct wavelength $\lambda_3$ that is assigned to the server 606-3 to the multiplexer 612b. Similar to mirrors 610c, each mirror 612c can be split into N mirrors corresponding to the N wavelengths. Alternatively, a 3D arrangement of mirrors can be adopted to enable the intended functions shown in FIG. 6. The multiplexer 612b multiplexes the received signals and transmits them via the virtual fibers within the DRpf 612a to the switch 602. Although the server 606-4 is physically connected to WSS 610 via physical fiber SRpf 610d for receiving and to WSS 612 via physical fiber 612d for transmitting, the physical fiber lines to represent optical signal paths are not shown in FIG. 6 for simplicity.

The vfAdapter controller 608 is connected to a system interface 620 for power and management signals to receive control signals provided by a switch controller of the switch 602. The control signals enable the vfAdapter controller 608 to generate control signals 614 and 616 for the mirrors 610c and 612c.

Figure 7:
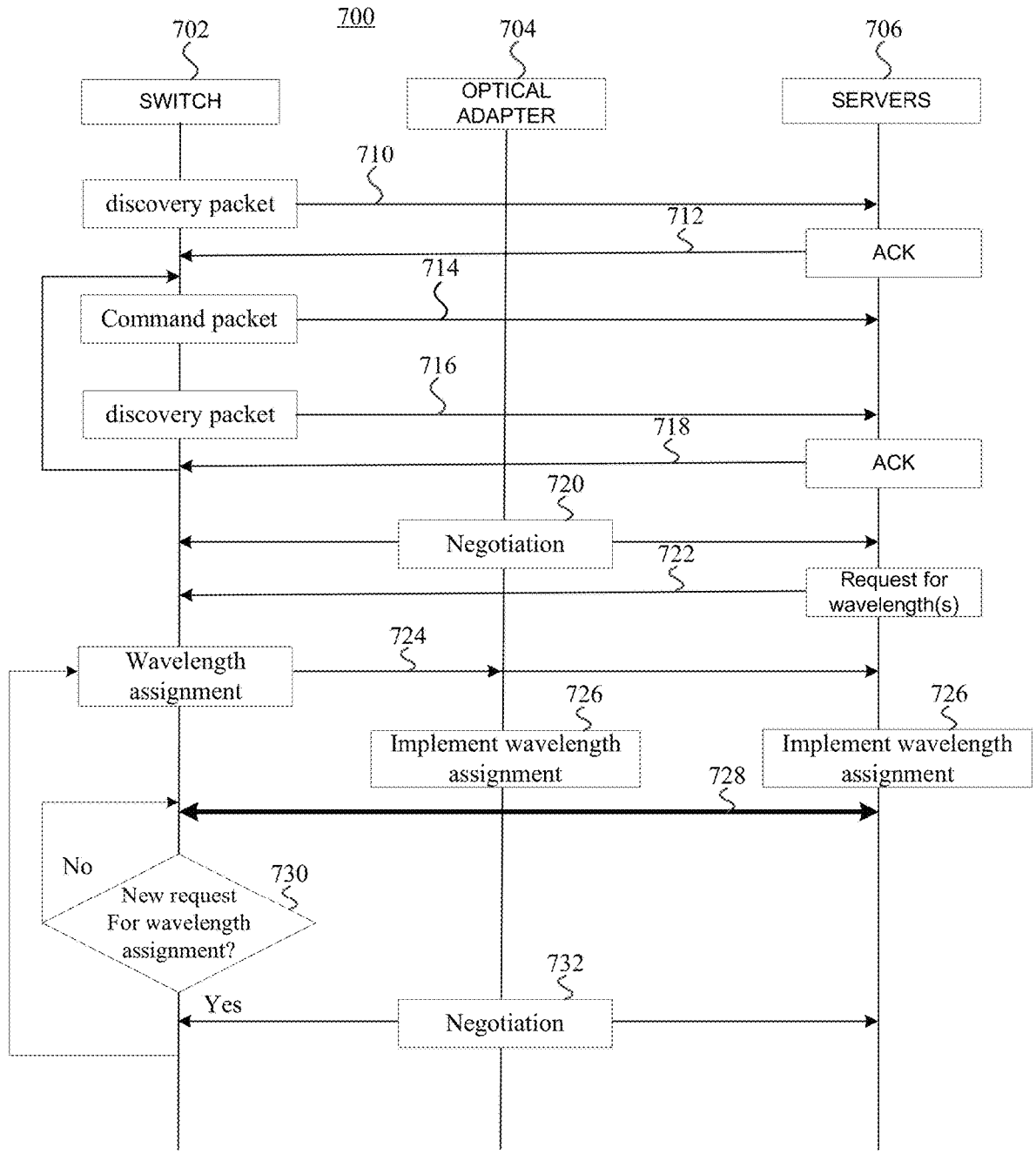
FIG. 7 is a ladder diagram illustrating a wavelength-as-a service environment implemented in a communication network, according to one example embodiment.

FIG. 7 is a ladder diagram illustrating a wavelength-as-a service environment 700 implemented in a communication network, according to one example embodiment. The communication network includes a switch 702, an optical adapter 704, and a plurality of servers 706. The switch 702 is connected to the optical adapter 704 via an optical cable/fiber, while the optical adapter 704 is connected to each of the servers 706 via an optical cable. In some implementations, operations 710, 714, 716, 718, 720, 722, 724, 726, 728 and 732 below represent process steps in a time order. It should be understood that the sequence may be changed without departing from the scope of this disclosure. At 710, the switch 702 broadcasts a discovery packet from a switch port to a plurality server ports of the servers 706 that are connected to the optical adapter 704. The switch 702 may broadcast the discovery packet using wavelengths available to the switch 702. At least some of the servers 706 (first servers) receive the discovery packet. At 712, each of the first servers that receives the discovery packet returns an acknowledgement (ACK) packet to the switch 702 via the optical adapter 704. Each of the ACK packets includes a unique identifier (UID) of a corresponding first server. In some implementations, each first server internally generates two random numbers (within a predefined maximum time slot range and a predefined maximum number of wavelengths range) and sends an ACK packet to switch port 702 with a random-number-1 delay and random-number-2 wavelength of the available wavelengths, to minimize contention among multiple servers transmitting wavelengths usage within the same physical fiber.

For a first server that responds with an ACK, the switch 702 transmits, through the switch port, a command packet at 714 to the first server based on the UID of the first server. The command packet indicates to the first server to ignore a subsequent discovery packet. The command packet effectively asks the first server to standby, wait for further instructions, and ignore any subsequent discovery packet. At 716, the switch 702 re-broadcasts the discovery packet via the optical adapter 704 to the servers 706. If no servers responded with an ACK after 710 then 712 and 714 do not happen, and first server response will be after the 716. If first server responded with 712 then 714 would happen. Some other server 706 (second servers) may receive the discovery packet and each returns an ACK packet to the switch 702 via the optical adapter 704. Each of the acknowledge packets from the second servers includes a UID of a corresponding second server. Because the first servers have been instructed to ignore the subsequent discovery packet, they will not return ACK packets. The process then returns to 714 for the switch 702 to send the command packet to the second servers based on their UIDs. In some implementations, the operations 714, 716, and 718 may be iterated for one or more times to ensure that most servers connected to the optical adapter 704 would pick up the discovery packet and return their ACK packets to the switch 702.

Subsequently, at 720 the switch 702 and the servers 706 that have been discovered establish communication channels via the optical adapter 704 and enter wavelength assignment negotiations. For example, during the negotiation at 722 each of the servers 706 may inform the switch 702 their needs for bandwidth. Some servers may indicate that they are busy with local computation tasks and cannot receive further packets or transmit packets. The switch 702 gathers the demands from the servers 706, and balances those demands based on available vfs. After the switch 702 successfully negotiates with the requesting servers to understand the demands for bandwidth, the switch 702 assigns one or more wavelengths/virtual fibers to a requesting server based on the request sent at 722. The switch 702 may assign specific wavelength(s) and periodic time slots/durations to the requesting server. The wavelength assignment may be based on a fair bandwidth rule or a Quality of Service (QoS) parameter specified in a Service Level Agreement (SLA), such as a guaranteed bandwidth for an application running on a server for a particular customer—hence, Wavelength-as-a-Service. A fair bandwidth rule may dictate that each of the servers 706 is given the same amount of wavelengths/virtual fibers. At 724, the switch 702 sends wavelength assignment instructions to the optical adapter 704 to enable the optical adapter 704 to implement the wavelength assignments to the servers 706. At 724, the switch 702 also sends wavelength assignment instructions to the servers 706, so that servers 706 set up its lane switch and follow what wavelengths to use for transmitting and receiving signals. As discussed above in connection with FIGS. 1-6, the optical adapter 704 may include a controller that is communicative with a switch controller of the switch 702. The controller of the optical adapter 704 can control a set of optical filter and/or mirrors to direct light signals to or from the servers 706. At 726, the controller of the optical adapter 704 is configured to implement the wavelength assignments without direct communication with the servers 706. Further, a processor/controller of each of the servers 706 is configured to implement the wavelength assignments for communications with the switch 702 using the assigned wavelength(s).

At 728, the switch 702 and the server 706 may begin packet communications based on the wavelength assignment. The wavelength assignment may be implemented for a specific time slot. For example, the optical adapter 704 may route one or more wavelengths to a server to use in packet communications for a time slot/period. In a non-limiting example, the time slot may be 1 second. During the time slot, the servers 706 may communicate packets to and from the switch 702 with the wavelength(s) assigned to individual servers. Also during the time slot, at 730 the switch 702 may continue to listen to the servers to learn if there is any new request for wavelength assignment. If there is no new request for wavelength assignment (No at 730), the switch allows the existing wavelength assignment to stand. The servers 706 can continue to use their assigned wavelength(s)/virtual fiber(s) to communicate packets in the next time slot (e.g., the next 1 second period). If the switch 702 receives a new request for wavelength assignment during the time slot (Yes at 730), at 732 the switch stops the prior wavelength assignment and enters into another negotiation stage with the servers 706. The negotiation at 732 results in new wavelength assignments for the servers 706. The new wavelength assignments are then sent from the switch 702 to the optical adapter 704 similar to operation 724.

The techniques presented in this disclosure allow a switch port to connect to multiple server ports via a vfAdapter. The wavelengths as virtual fibers may be statically or dynamically assigned to the server ports based on negotiations between the switch port and the server ports. Wavelengths for transmission from, or reception by, each of the servers may be manipulated, providing an efficient and cost-effective solution to network communications between the switch and the servers. Each server port can flexibly have up to the maximum bandwidth of the switch port bandwidth for programmable time slots, while only one switch port is used to connect to multiple server ports. Fewer switches are needed to connect to a number of servers, or more servers can be connected to a switch, compared to traditional point-to-point method where a fix connection is dedicated between a switch and a server for the maximum switch port bandwidth.

Figure 8:
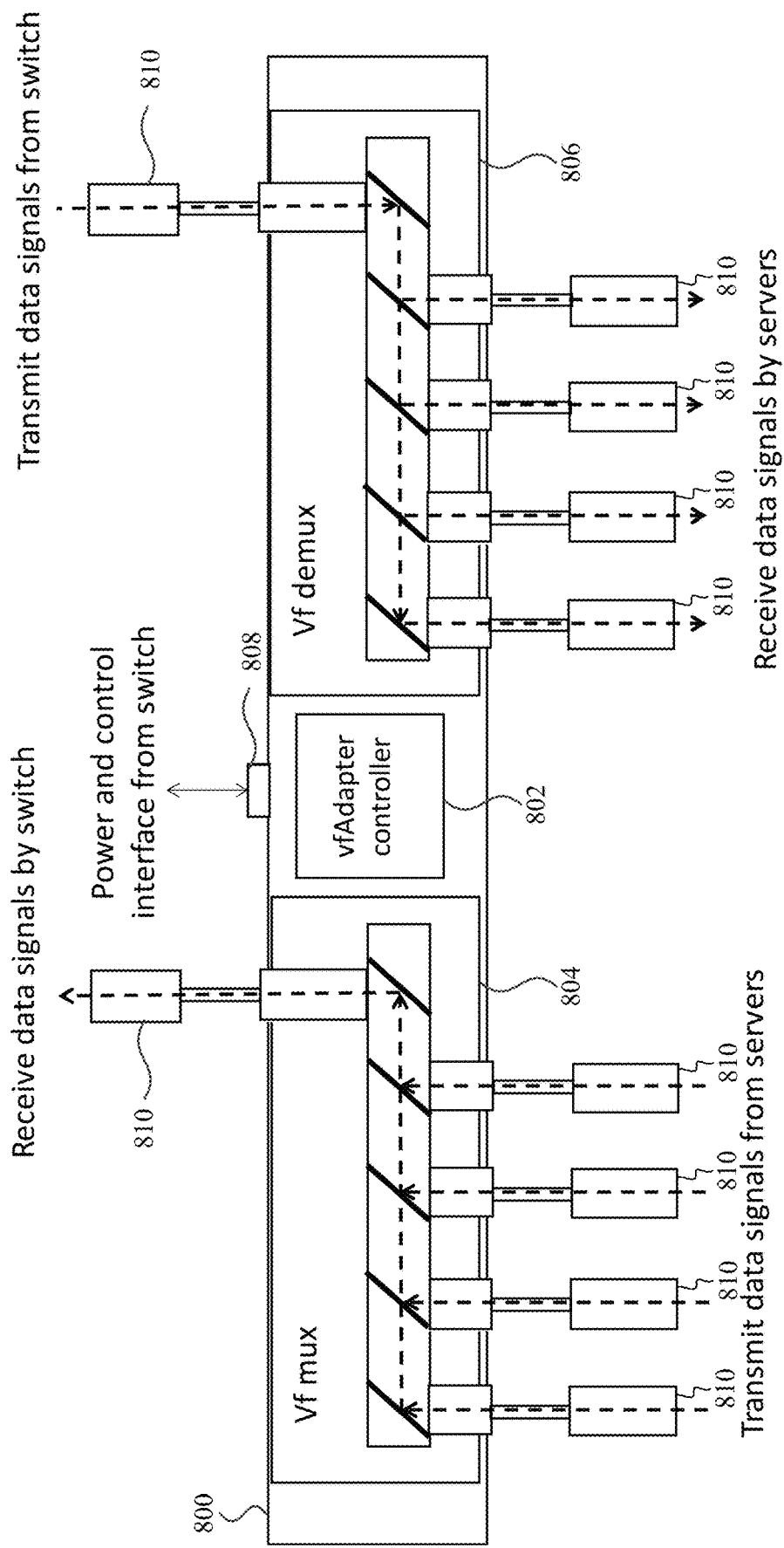
FIG. 8 is a diagram illustrating an example physical implementation of a vfAdapter, according to one embodiment.

FIG. 8 is a diagram illustrating one example physical implementation of a vfAdapter 800, according to one embodiment. The vfAdapter 800 includes a vfAdapter controller 802, a vf multiplexer 804, a vf demultiplexer 806, a power and control interface connector 808, and a plurality of pigtail cables 810. The vfAdapter 800 is designed to be a standalone optical adapter that can be used to connect multiple server ports to one switch port. The vf multiplexer 804 is configured to receive signals from the servers, multiplex the received signals, and then send the multiplexed signals to the switch port. The vf demultiplexer 806 is configured to receive multiplexed signals from the switch port, demultiplex the received signals, and then send the demultiplexed signals to the servers. The power and control interface connector 808 is connected to a power and control interface of the switch to receive control signals for the vfAdapter controller 802. The control signals enable the vfAdapter controller 802 to implement wavelength assignments for the servers. The power and control interface connector 808 is configured to receive power for the vfAdapter 800. The pigtail cables 810 allow the vfAdapter 800 to be easily connected to the switch and the servers. In some embodiments, the pigtail cables 810 are two-fiber duplex cables.

Figure 9:
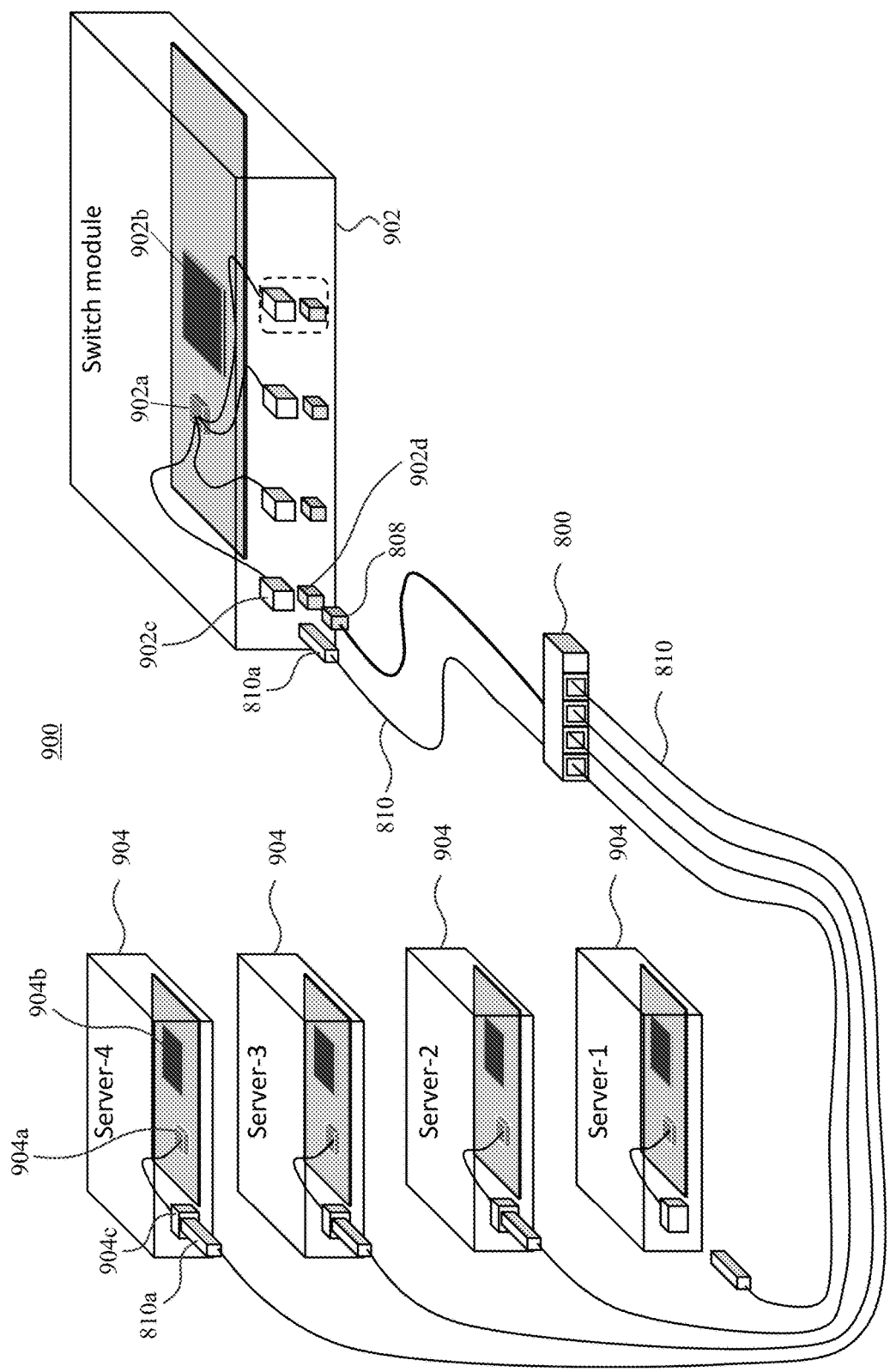
FIG. 9 is a diagram illustrating a communication network that adopts the vfAdapter in FIG. 8, according to one example embodiment.

FIG. 9 is a diagram illustrating a communication network 900 that adopts the vfAdapter 800, according to one embodiment. The communication network 900 includes a switch module 902 and a plurality of server 904 (four illustrated in FIG. 9). The switch module 902 includes an optical transceiver 902a, a switch ASIC 902b, a plurality of fiber optical receptacles 902c, and a plurality of electrical receptacles 902d. The optical transceivers 902a may comprise mux/demux. The optical transceiver 902a is connected to the fiber optical receptacles 902c to receive optical signals from and transmit optical signals to the servers 904 via the vfAdapter 800. The switch ASIC 902b is connected to the fiber optical receptacles 902c to process packets. The switch ASIC 902b is connected to an electrical receptacle 902d to communicate with the vfAdapter 800. The fiber optical receptacle 902c is configured to receive an optical connector 810a of the pigtail cable 810. The electrical receptacle 902d is configured to receive the power and control interface connector 808 of the vfAdapter 800. Each of the server 904 includes an optical transceiver 904a, a processor 904b, and a plurality of fiber optical receptacles 904c. The optical transceiver 904a is connected to the fiber optical receptacles 904c to receive optical signals from and transmit optical signals to the switch 902 via the vfAdapter 800. The processor 904b is configured to perform various computing tasks generally required for a server. The fiber optical receptacle 904c is configured to receive an optical connector 810a of the pigtail cable 810. The optical transceivers 904a may comprise mux/demux and lane switches.

Figure 10:
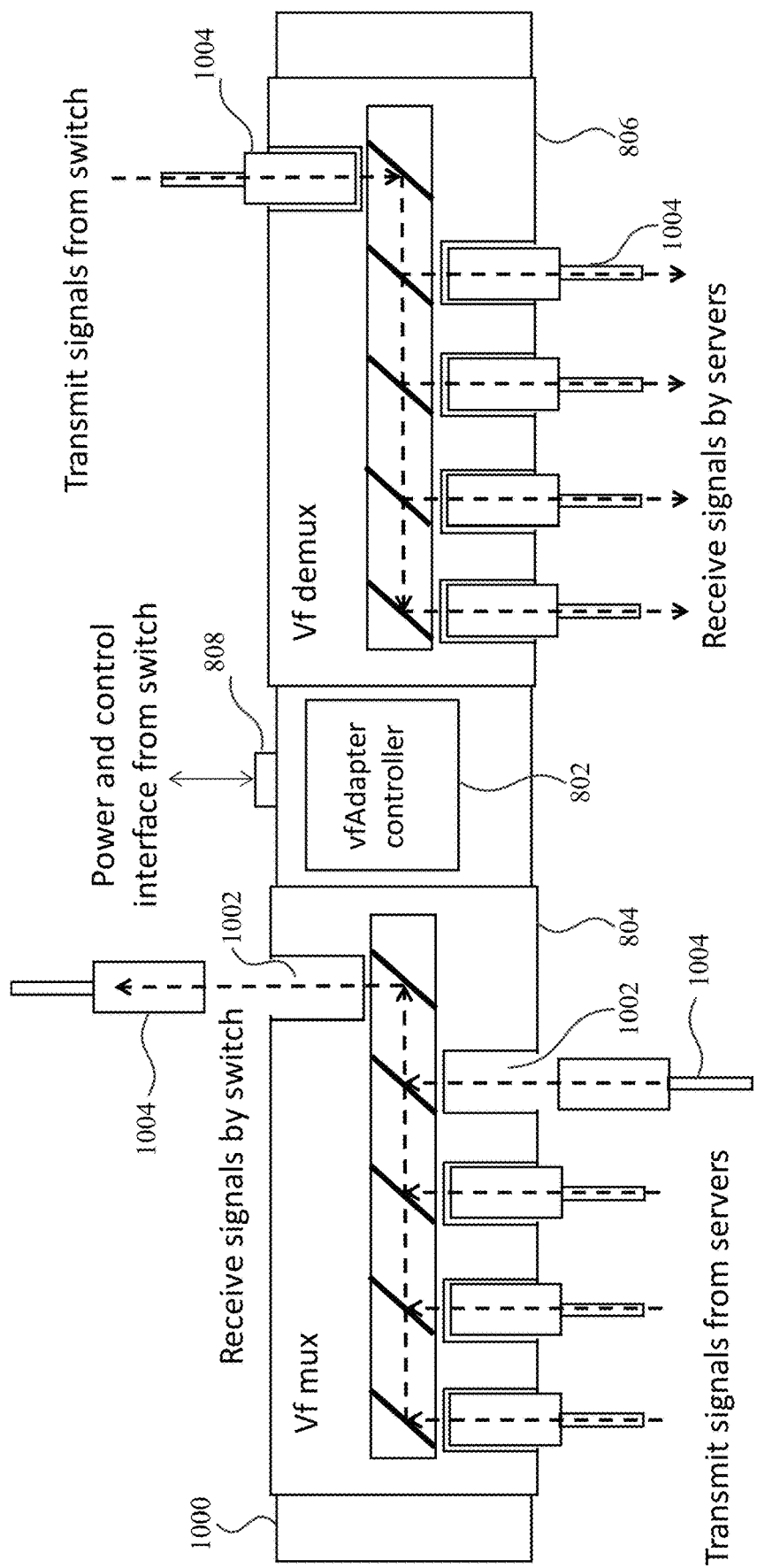
FIG. 10 is a diagram illustrating another example physical implementation of a vfAdapter, according to one embodiment.

FIG. 10 is a diagram illustrating another example physical implementation of a vfAdapter 1000, according to one embodiment. The vfAdapter 1000 is similar to the vfAdapter 800 in FIG. 8 except that the vfAdapter 1000 now includes a plurality of optical receptacles 1002 to replace the pigtail cables. The optical receptacles 1002 are configured to receive connectorized cables 1004.

Figure 11:
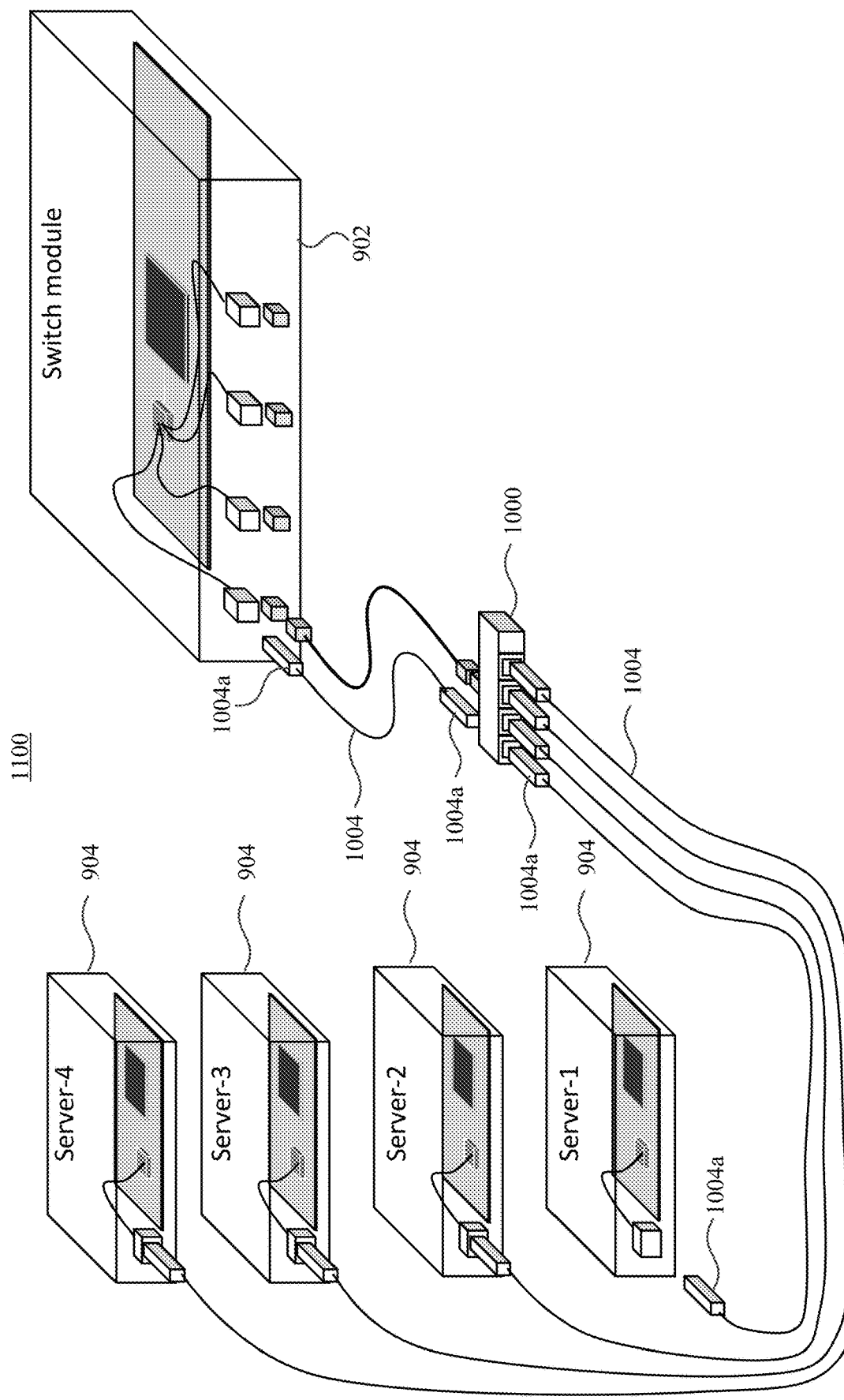
FIG. 11 is a diagram illustrating a communication network that adopts the vfAdapter illustrated in FIG. 10, according to one embodiment.

FIG. 11 is a diagram illustrating a communication network 1100 that adopts the vfAdapter 1000 illustrated in FIG. 10, according to one embodiment. The communication network 1100 is similar to the communication network 900 in FIG. 9 except that connectorized cables 1004 are used to connect the switch module 902 to the vfAdapter 1000, and to connect the vfAdapter 1000 to the servers 904. Each of the connectorized cables 1004 includes an optical connector 1004a at each end of the cable. The connectorized cables 1004 may be two-fiber duplex cables.

Figure 12:
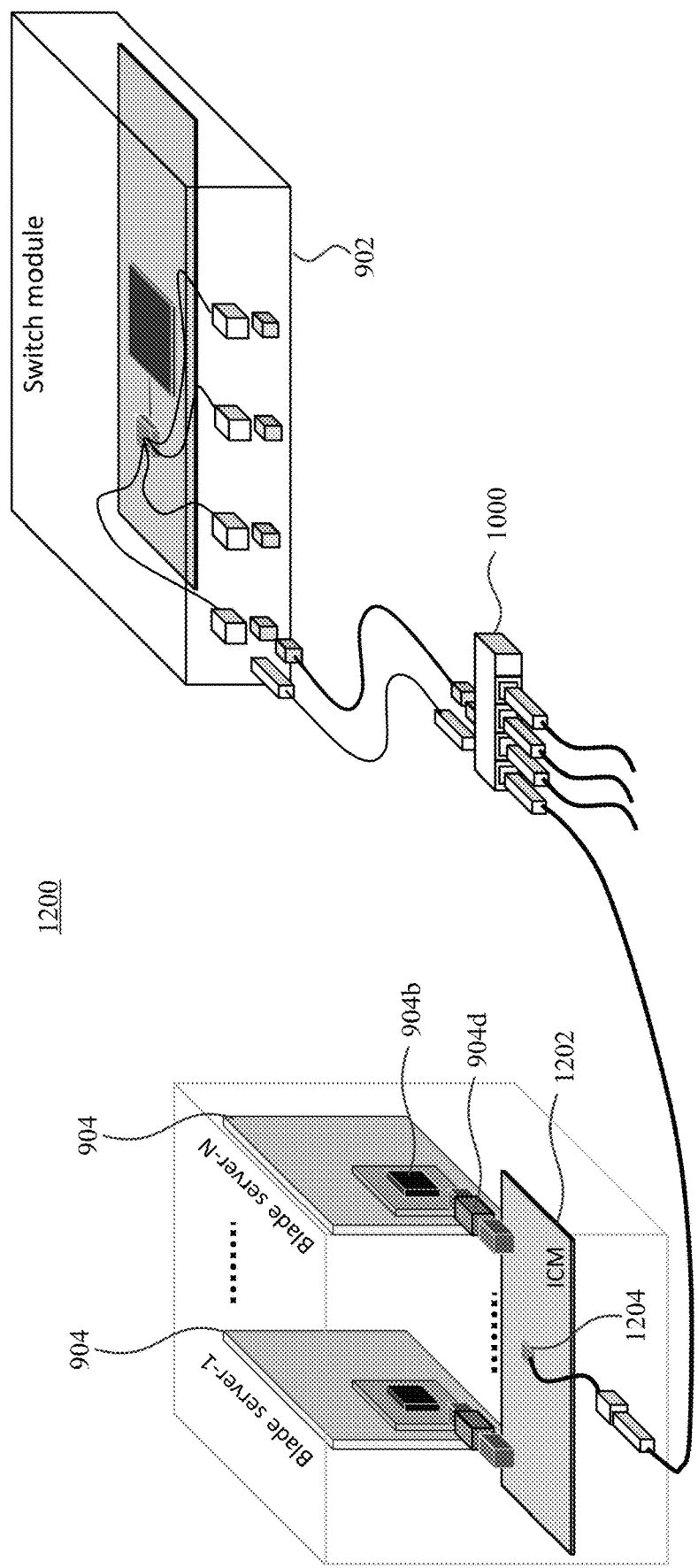
FIG. 12 is a diagram illustrating another communication network that adopts the vfAdapter illustrated in FIG. 10, according to one embodiment.

FIG. 12 is a diagram illustrating a communication network 1200 that adopts the vfAdapter 1000 illustrated in FIG. 10, according to one embodiment. The communication network 1200 is similar to the communication network 1100 in FIG. 11 except that the servers 904 are modularized as server blades. Each of the server blades 904 includes at least one processor 904b and an electrical midplane connector 904d. Each of the N server blades 904 is connected to an interconnect module board 1202 via the electrical midplane connector 904d. The interconnect module board 1202 includes an optical transceiver 1204 configured to receive optical signals from and transmit optical signals to the switch module 902 via the vfAdapter 1000.

Figure 13:
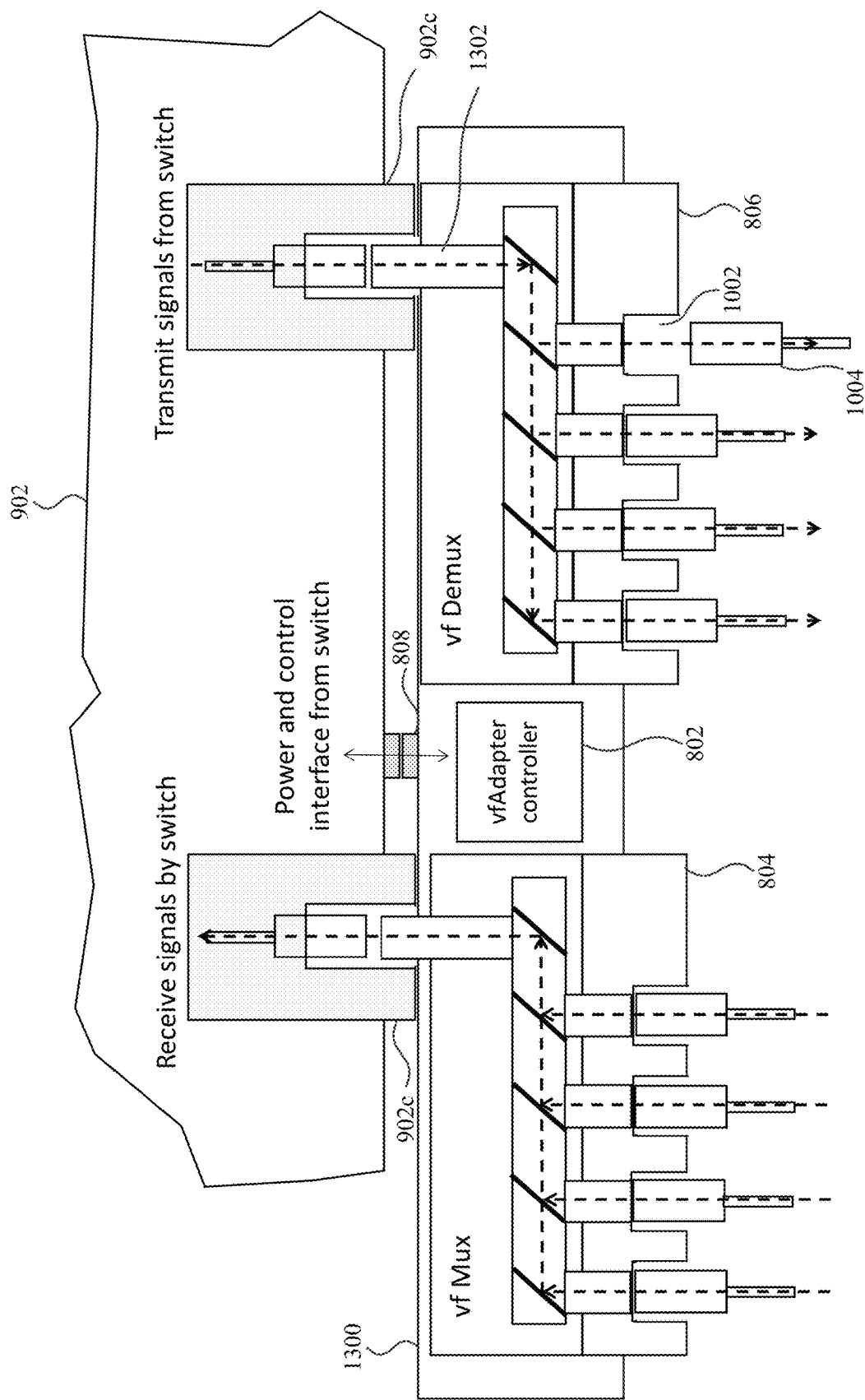
FIG. 13 is a diagram illustrating another example physical implementation of a vfAdapter, according to one embodiment.

FIG. 13 is a diagram illustrating another example physical implementation of a vfAdapter 1300, according to one embodiment. The vfAdapter 1300 is similar to the vfAdapter 1000 in FIG. 10 except that the vfAdapter 1300 now includes connectors 1302 for establishing a connection to the switch module 902 (FIG. 9). The connectors 1302 allows the vfAdapter 1300 to be plugged into the switch module 902 without a need of connecting cables. The switch module 902 includes corresponding optical receptacles 902c to receive the connectors 1302 of the vfAdapter 1300.

Figure 14:
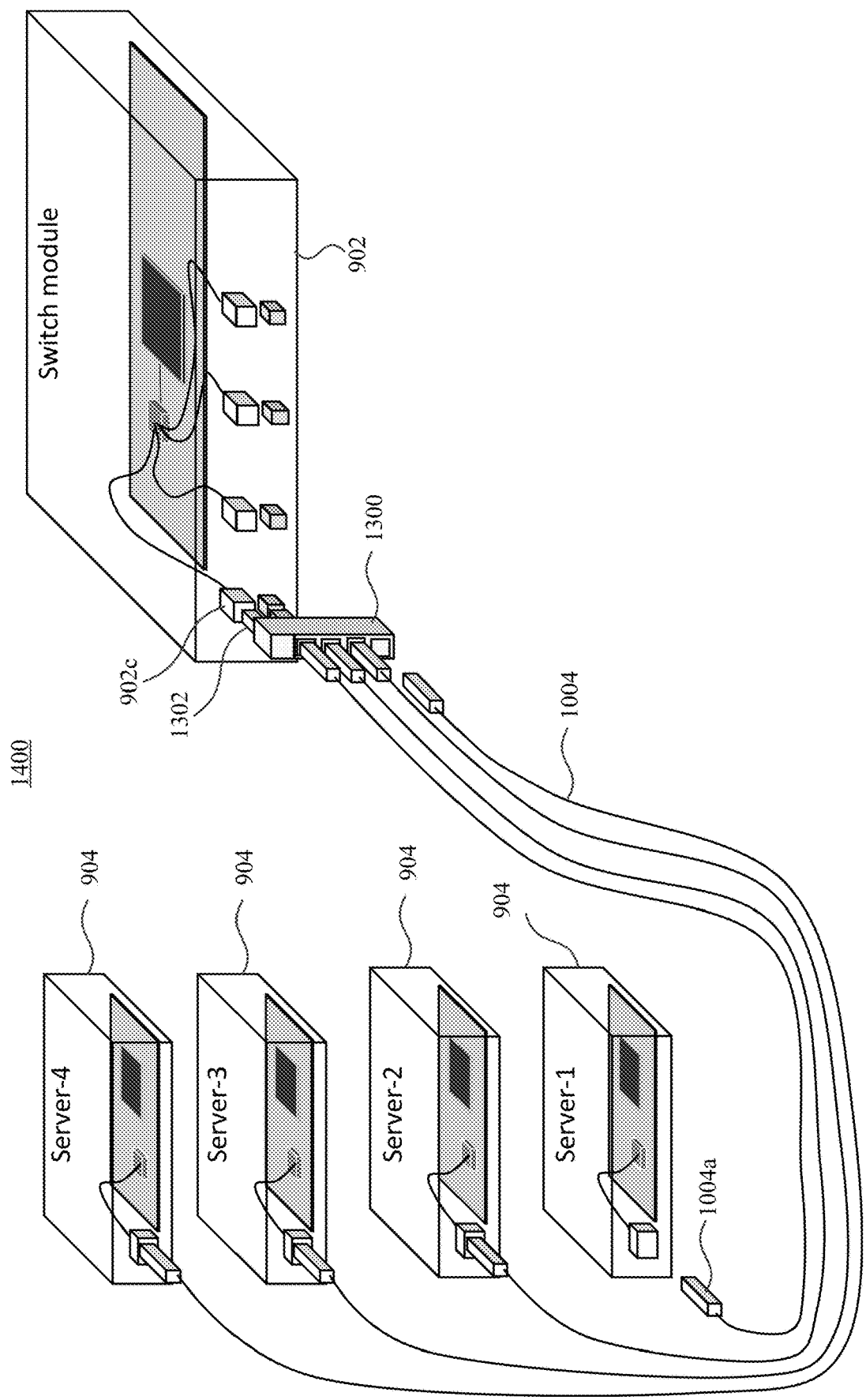
FIG. 14 is a diagram illustrating a communication network that adopts the vfAdapter illustrated in FIG. 13, according to one embodiment.

FIG. 14 is a diagram illustrating a communication network 1400 that adopts the vfAdapter 1300 illustrated in FIG. 13, according to one embodiment. The communication network 1400 is similar to the communication network 1100 in FIG. 11 except that the vfAdapter 1300 can be plugged into the switch module 902.

Figure 15:
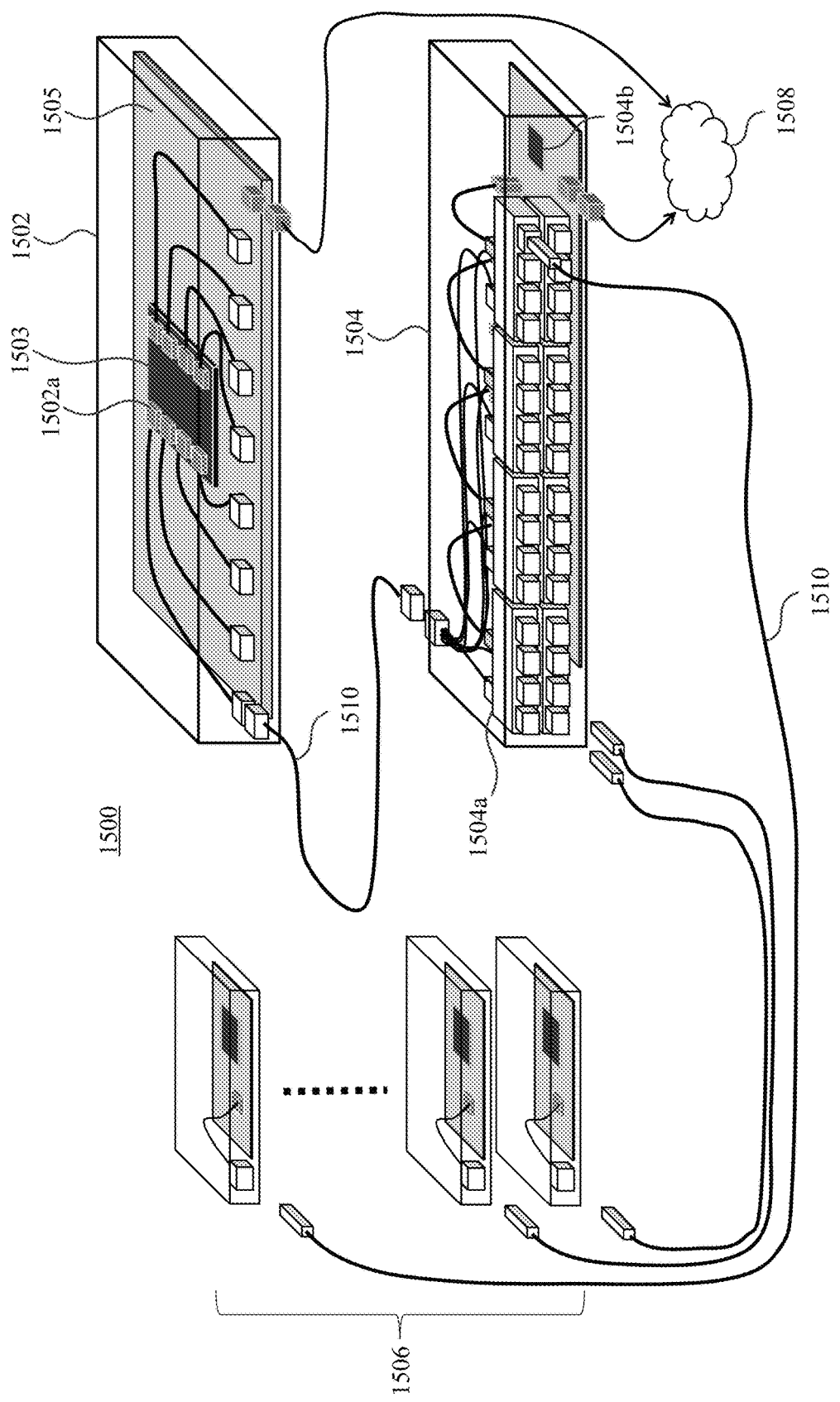
FIG. 15 is a diagram illustrating a communication network according to one embodiment.

FIG. 15 is a diagram illustrating a communication network 1500 according to one embodiment. The communication network 1500 includes a switch module 1502, a switch port expander module 1504, and a plurality of servers 1506. The switch module 1502 includes 8 optical transceivers 1502a each of which can be connected to a number (e.g., 4) of servers 1506 via the switch port expander module 1504. In some embodiments, the optical transceivers 1502a may be co-packaged with the switch ASIC 1503 as shown in FIG. 15. In other embodiments, the optical transceivers 1502a may be mid-board optics, i.e., multiple discrete optical transceivers 1502a and the switch ASIC 1503 disposed on the switch board 1505. The switch port expander module 1504 includes a plurality of vfAdapters 1504a each corresponding to a switch port (optical transceiver) 1502a. The switch port expander module 1504 further includes a controller ASIC 1504b connected to a power and management network 1508 to receive power and/or control signals from the switch module 1502. Each of the servers 1506 may be connected to the switch port expander module 1504 through connectorized cables 1510. Similarly, the switch port expander module 1504 may be connected to the switch module 1502 through connectorized cables 1510. In one implementation, the switch port expander module 1504 can include 8 vfAdapters to connect 256 servers to the switch module 1502. The switch module 1502 may have 8 multi-fiber-plug-on (MPO) faceplate connectors for the connection to the 256 servers.

Figure 16:
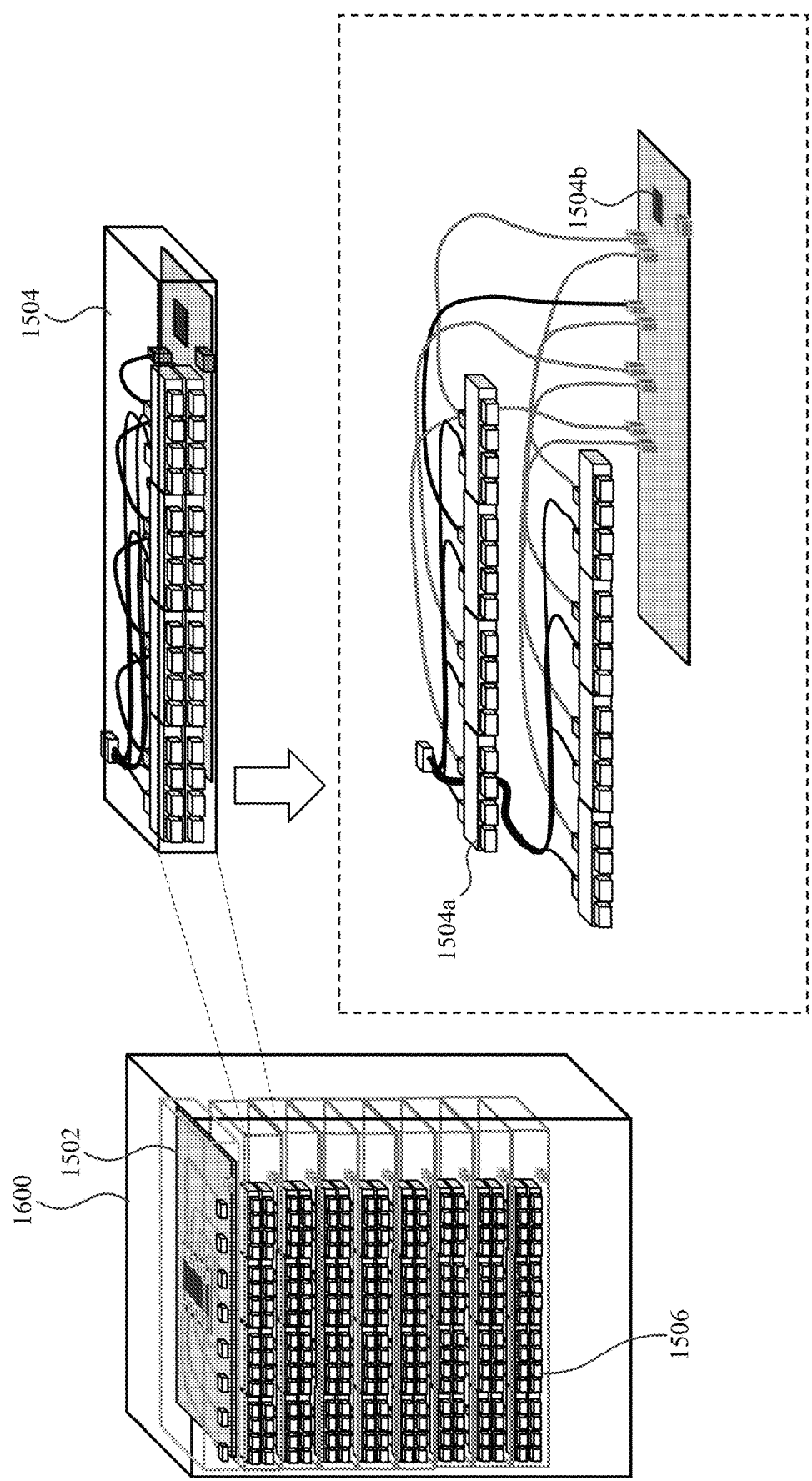
FIG. 16 is a diagram illustrating a server tower as one solution to implement the communication network 1500 illustrated in FIG. 15, according to one embodiment.

FIG. 16 is a diagram illustrating a server tower 1600 as one solution to implement the communication network 1500 in FIG. 15, according to one embodiment. As shown in FIG. 16, the switch module 1502, the switch port expander module 1504, and the servers 1506 can be placed in a tower rack 1508. This configuration can save space needed to implement the communication network 1500.

In summary, the techniques disclosed herein provide a communication network where a switch port may be connected to multiple server ports via a vfAdapter. The packet communications in the network may be implemented with a wavelength division multiplexing technique and/or a time division multiplexing technique, resulting in a more efficient and cost-effective solution. The wavelength assignment in the network for the servers can be realized with weighted allocation or unweighted allocation to flexibly making assignment decisions based on the needs of the servers. The wavelength assignment may be implemented with the concept of wavelength-as-a-service scheme in which each wavelength in the network can be dynamically re-assigned as a virtual fiber. The assignment of virtual fibers can be based on a datacenter operating policies for bandwidth management or a Service Level Agreement. Virtual fibers in downstream (from switch to servers) and/or upstream (from servers to switch) traffic may be independently assigned.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical adapter comprising:
   a first interface connected to an optical switch via a first optical cable;
   a second interface connected to a plurality of server ports via a plurality of second optical cables;
   a set of optical filters or mirrors corresponding to each of the server ports;
   a first multiplexer coupled between the optical filters or mirrors and the first optical cable, wherein the first multiplexer is configured to perform wavelength multiplexing on optical signals from one or more of the server ports via the optical filters or mirrors; and
   a controller coupled to a switch controller of the optical switch, wherein the controller is configured to perform:
      obtaining instructions from the switch controller;
      assigning, based on the instructions, one or more wavelengths for a time slot to one of the server ports, wherein the controller performs the assigning without direct communication with the server ports; and
      controlling each of the optical filters or mirrors to direct optical signals.

2. The optical adapter of claim 1, further comprising:
   a plurality of first demultiplexers each coupled between the optical filters or mirrors and one of the second optical cables, wherein each of the first demultiplexers is capable of demultiplexing a multiplexed optical signal from one of the server ports.

3. The optical adapter of claim 2, further comprising:
   a second demultiplexer coupled between the optical filters or mirrors and the first optical cable, wherein the demultiplexer is configured to perform wavelength demultiplexing on optical signals from the switch port.

4. The optical adapter of claim 3, further comprising:
   a plurality of second multiplexers each coupled between the optical filters or mirrors and one of the second optical cables, wherein each of the second multiplexers is capable of multiplexing optical signals from the optical filters or mirrors.

5. A method for wavelengths as a service in a communication network, the method comprising:
   broadcasting, by a switch from a switch port to a plurality of server ports connected to an optical adapter, a discovery packet;
   obtaining one or more first acknowledge packets from one or more first servers through one or more corresponding first server ports of the one or more first servers, wherein each of the one or more first acknowledge packets includes a unique identifier of a corresponding first server;

transmitting, through the switch port, a command packet to each of the one or more first servers based on the unique identifiers of the one or more first servers, wherein the command packet indicates to the one or more first servers to ignore a subsequent discovery packet; and re-broadcasting the discovery packet via the optical adapter;

obtaining one or more second acknowledge packets from one or more second servers through corresponding one or more second server ports of the one or more second servers, wherein each of the one or more second acknowledge packets includes a unique identifier of a corresponding second server, wherein the one or more second servers are different from the one or more first servers;

establishing communication channels with the servers that transmit the one or more first acknowledge packets and the one or more second acknowledge packets to the switch; and assigning, by a controller of the switch, one or more wavelengths to one of the servers.

6. The method of claim 5, wherein the controller of the switch is configured to perform:

obtaining, from each of the servers that transmit the one or more first acknowledge packets and the one or more second acknowledge packets to the switch, a request for wavelength assignment; and assigning to a requesting server one or more wavelengths based on a corresponding request.

7. The method of claim 6, wherein the controller of the switch is configured to perform:

transmitting instructions to a controller of the optical adapter to enable the controller of the optical adapter to assign, based on the instructions and without direct communication with the servers, one or more wavelengths for a time slot to one of the servers.

8. The method of claim 6, wherein the controller of the switch is configured to perform:

assigning to the requesting server the one or more wavelengths for a time period.

9. The method of claim 8, wherein the controller of the switch is configured to assign to the requesting server the one or more wavelengths for the time period based on a Service Level Agreement between the switch and the requesting server.

10. The method of claim 8, wherein the controller of the switch is configured to perform:

assigning to all requesting servers a same amount of wavelengths for the time period.

11. The method of claim 8, wherein the controller of the switch is configured to perform:

determining whether a new request for wavelength assignment is obtained within the time period; and in response to that a new request for wavelength assignment is obtained within the time period, initiating wavelength assignment negotiation with the servers that transmit the one or more first acknowledge packets and the one or more second acknowledge packets to the switch; and determining a new wavelength assignment based on the wavelength assignment negotiation.

12. The method of claim 11, wherein the controller of the switch is configured to perform:

in response to that no new request for wavelength assignment is obtained within the time period, allowing the requesting server to continue to use the one or more wavelengths.

13. A non-transitory computer-readable storage medium storing computer instructions that, when executed by a processor, cause the processor to perform operations comprising:

broadcasting, by a switch from a switch port to a plurality server ports connected to an optical adapter, a discovery packet;

obtaining one or more first acknowledge packets from one or more first servers through one or more corresponding first server ports of the one or more first servers, wherein each of the one or more first acknowledge packets includes a unique identifier of a corresponding first server;

transmitting, through the switch port, a command packet to each of the first one or more servers based on the unique identifiers of the one or more first servers, wherein the command packet indicates to the one or more first servers to ignore a subsequent discovery packet; and re-broadcasting the discovery packet via the optical adapter;

obtaining one or more second acknowledge packets from one or more second servers through corresponding one or more second server ports of the one or more second servers, wherein each of the one or more second acknowledge packets includes a unique identifier of a corresponding second server, wherein the one or more second servers are different from the one or more first servers;

establishing communication channels with the servers that transmit the one or more first acknowledge packets and the one or more second acknowledge packets to the switch; and assigning one or more wavelengths to one of the servers.

14. The non-transitory computer-readable storage medium of claim 13, wherein the instructions further cause the processor to perform:

obtaining, from each of the servers that transmit the one or more first acknowledge packets and the one or more second acknowledge packets to the switch, a request for wavelength assignment; and assigning to a requesting server one or more wavelengths based on a corresponding request.

15. The non-transitory computer-readable storage medium of claim 14, wherein the instructions further cause the processor to perform:

transmitting instructions to a controller of the optical adapter to enable the controller of the optical adapter to assign, based on the instructions and without direct communication with the servers, one or more wavelengths for a time slot to one of the servers.

16. The non-transitory computer-readable storage medium of claim 14, wherein the instructions further cause the processor to perform:

assigning to the requesting server the one or more wavelengths for a time period.

17. The non-transitory computer-readable storage medium of claim 16, wherein the instructions further cause the processor to perform:

determining whether a new request for wavelength assignment is obtained within the time period; and in response to that a new request for wavelength assignment is obtained within the time period, initiating wavelength assignment negotiation with the servers that transmit the one or more first acknowledge packets and the one or more second acknowledge packets to the switch; and determining a new wavelength assignment based on the wavelength assignment negotiation.

18. The non-transitory computer-readable storage medium of claim 17, wherein the instructions further cause the processor to perform:

in response to that no new request for wavelength assignment is obtained within the time period, allowing the requesting server to continue to use the one or more wavelengths.

\* \* \* \* \*